United States Patent
Agombar et al.

(10) Patent No.: US 10,210,063 B2
(45) Date of Patent: Feb. 19, 2019

(54) DISK ARRAY STORAGE CONTROLLER

(71) Applicant: International Business Machines Corporation, Armonk, NY (US)

(72) Inventors: John P. Agombar, Winchester (GB); Ian Boden, Eastleigh (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/424,859

(22) Filed: Feb. 5, 2017

(65) Prior Publication Data

US 2018/0225184 A1    Aug. 9, 2018

(51) Int. Cl.
  *G06F 11/07*    (2006.01)
  *G06F 11/20*    (2006.01)
  *G06F 3/06*     (2006.01)

(52) U.S. Cl.
  CPC .......... *G06F 11/2094* (2013.01); *G06F 3/064* (2013.01); *G06F 3/0619* (2013.01); *G06F 3/0647* (2013.01); *G06F 3/0689* (2013.01); *G06F 2201/805* (2013.01); *G06F 2201/82* (2013.01)

(58) Field of Classification Search
  CPC .................................................. G06F 11/1096
  USPC ....................................................... 714/6.21
  See application file for complete search history.

(56) References Cited

U.S. PATENT DOCUMENTS

| | | | | |
|---|---|---|---|---|
| 6,269,453 | B1 * | 7/2001 | Krantz | G06F 11/1084 |
| | | | | 714/19 |
| 7,103,716 | B1 * | 9/2006 | Nanda | G06F 11/1076 |
| | | | | 711/114 |
| 7,970,996 | B1 | 6/2011 | Corbett | |
| 8,099,623 | B1 | 1/2012 | Li et al. | |
| 8,316,180 | B2 | 11/2012 | Galloway et al. | |
| 8,732,411 | B1 * | 5/2014 | Chatterjee | G06F 3/0641 |
| | | | | 711/147 |
| 9,389,958 | B2 | 7/2016 | Sundaram et al. | |
| 2003/0126523 | A1 | 7/2003 | Corbett et al. | |

(Continued)

OTHER PUBLICATIONS

Deng, Ming-Zhu, et. al., "Raid-6plus: A Fast And Reliable Coding Scheme Aided By Multi-Failure Degradation," SpringerLink, Advances in Services Computing, vol. 9464 of the series Lecture Notes in Computer Science, pp. 210-221, Dec. 9, 2015.

*Primary Examiner* — Chae M Ko
(74) *Attorney, Agent, or Firm* — Nelson and Nelson; Daniel P. Nelson; Alexis V. Nelson

(57) ABSTRACT

This invention relates to a system, method and computer program product for a drive array controller (for example a RAID6 controller) comprising: a failed strip identifier for identifying a failed strip in a critical stride strip in drive array when the drive array has two or more failed drives, a critical stride is a stride with two (for example) failed strips, a failed strip is a strip in a failed drive, a failed drive is a drive that can no longer be reliably used; a safe strip identifier for identifying a safe strip in a safe stride, a safe stride is a stride with no failed strips (or at least two less than a critical stride), a safe strip is a strip in a safe stride; a drive array writer for writing a recalculated failed strip to the drive array location for the safe strip; and a lending table writer for writing the failed strip location and associated safe strip location to a lending table.

11 Claims, 9 Drawing Sheets

Stride Table 500A

| Stride | Array Location |
|---|---|
| 1 | 1A |
| 2 | 6A |
| 3 | 2B |
| 4 | 7B |
| 5 | 3C |
| 6 | 8C |
| 7 | 4D |

Critical Stride List 500B

| Critical Stride | (Failed Strips) |
|---|---|
| 2 | (2Z,2P) |
| 4 | (4Y,4Z) |
| 6 | (6X,6Y) |

Safe Stride List 500C

| Safe Stride | (Safe Strip) |
|---|---|
| 1 | (5A) |
| 3 | (6B) |
| 5 | (7C) |

Lending Table 500D

| Failed Strip | Safe Strip |
|---|---|
| 2Z | 5A |
| 4Y | 6B |
| 6X | 7C |

(56) References Cited

U.S. PATENT DOCUMENTS

2005/0166083 A1\* 7/2005 Frey, Jr. .............. G06F 11/1076
714/6.2
2006/0236029 A1\* 10/2006 Corrado .............. G06F 11/1076
711/114

\* cited by examiner

RAID6 Redistribution Controller 200

Redistribution Interface 202

Failed Strip Identifier 204

Safe Strip Identifier 206

Disk Array Writer 208

Lending Table Writer 210

Lending Table 212

Redistribution Method 300

Redistribution Read Method 340

Redistribution Write Method 380

Figure 2B

Disks 35

| | 1 | 2 | 3 | 4 | 5 | 6 | 7 | 8 | 9 |
|---|---|---|---|---|---|---|---|---|---|
| A | 1X | 1Y | 1Z | 1P | 1Q | 2X | 2Y | 2Z | 2P |
| B | 2Q | 3X | 3Y | 3Z | 3P | 3Q | 4X | 4Y | 4Z |
| C | 4P | 4Q | 5X | 5Y | 5Z | 5P | 5Q | 6X | 6Y |
| D | 6Z | 6P | 6Q | 7X | 7Y | 7Z | 7P | 7Q | - |

Figure 4A

Disks 35

| | 1 | 2 | 3 | 4 | 5 | 6 | 7 | 8 | 9 |
|---|---|---|---|---|---|---|---|---|---|
| A | 1X | 1Y | 1Z | 1P | 1Q | 2X | 2Y | ~~2Z~~ | ~~2P~~ |
| B | 2Q | 3X | 3Y | 3Z | 3P | 3Q | 4X | ~~4Y~~ | ~~4Z~~ |
| C | 4P | 4Q | 5X | 5Y | 5Z | 5P | 5Q | ~~6X~~ | ~~6Y~~ |
| D | 6Z | 6P | 6Q | 7X | 7Y | 7Z | 7P | ~~7Q~~ | - |

Figure 4B

Disks 35

| | 1 | 2 | 3 | 4 | 5 | 6 | 7 | 8 | 9 |
|---|---|---|---|---|---|---|---|---|---|
| A | 1X | 1Y | 1Z | 1P | 2Z | 2X | 2Y | ~~2Z~~ | ~~2P~~ |
| B | 2Q | 3X | 3Y | 3Z | 3P | 4Y | 4X | ~~4Y~~ | ~~4Z~~ |
| C | 4P | 4Q | 5X | 5Y | 5Z | 5P | 6X | ~~6X~~ | ~~6Y~~ |
| D | 6Z | 6P | 6Q | 7X | 7Y | 7Z | 7P | ~~7Q~~ | - |

Figure 4C

Stride Table 500A

| Stride | Array Location |
|---|---|
| 1 | 1A |
| 2 | 6A |
| 3 | 2B |
| 4 | 7B |
| 5 | 3C |
| 6 | 8C |
| 7 | 4D |

Critical Stride List 500B

| Critical Stride | (Failed Strips) |
|---|---|
| 2 | (2Z,2P) |
| 4 | (4Y,4Z) |
| 6 | (6X,6Y) |

Safe Stride List 500C

| Safe Stride | (Safe Strip) |
|---|---|
| 1 | (5A) |
| 3 | (6B) |
| 5 | (7C) |

Lending Table 500D

| Failed Strip | Safe Strip |
|---|---|
| 2Z | 5A |
| 4Y | 6B |
| 6X | 7C |

Figure 5

DISK ARRAY STORAGE CONTROLLER

BACKGROUND

The present invention relates to a method and apparatus for a storage controller for an array of disks. In particular, the present invention relates to a method and apparatus for a RAID6 controller.

An array of disks can be configured from independent disk drives into a single logical unit for the purposes of data redundancy and/or performance. RAID5 is an example of a disk array configuration that can survive a single drive failure due to having an independent parity value calculated for each element of all the user's data that is being stored. RAID6 is an example of a disk array configuration that can survive a double drive failure due to having two independent parity values calculated for each element of all the user's data that is being stored. Erasure coding is an example of a disk array that can survive a configurable number of drive failures if enough redundant data has been stored in the disk array.

Losing a single parity value means that the array's protection is degraded, but simultaneously losing a second means the array is critically degraded and can now not cope with any additional failures. In a standard RAID6 array this status applies to the whole array, as every stride uses every drive, so every stride is impacted equally. It does not matter whether the drive that is providing data to a stride is being used for parity, or data values in that stride as both must be used in recovery.

A strip is a segment of data on a disk (see strip 11 in FIG. 1B). A strip is part of a stride, a stride is a sequence of strips across a respective sequence of disks (see stride 1 in FIG. 1B). A stride comprises three data strips and two parity strips in the example of FIG. 1B but two, three, four or more data strips can be part of a stride. For RAID6 two parity strips are necessary.

Distributed RAID6 takes the RAID6 concept and distributes it over a larger set of drives than the number of drives used in a single parity calculation (this is sometimes termed 'wide-striping'). This means that every stride occupies a subset of all the drives in the distributed array. This means that on the failure of a single drive or two drives, not all strides (which is the term used for the set of data values related by common parity) are impacted equally. In distributed Raid6, in the event of a double failure some strides will be impacted by both failures, some by one of the failures and others strides have neither of the failing drives in them and are not impacted at all.

In approaches used to date, until the critical strides (impacted by both failures) can have at least one parity or data value rebuilt, another failure will result in loss of data. Anything that delays the completion of rebuild will delay the exit of this critically degraded state.

As strides are required to be spread across drives, load balancing means that the sets of drives involved in any stride are spread so that no two drives are paired in one parity set for recovery purposes, significantly more than any other two drives. An array is said to be in a critical state when a small percentage of strides are critical and critically degraded when no spares are available.

If an array is critically degraded, the longer this state continues, the higher the priority of suffering a subsequent failure while critically degraded. If a drive fails, the probability of suffering two subsequent failures is the square of the probability of suffering one more. Additionally, if the system is going to suffer two more failures it is quite possible that these will not occur at the same time and the system may be able to react to the first subsequent failure prior to the second occurring.

In a traditional RAID array, losing 4 drives (out of 11 for example) is only likely to happen when there are cross drive issues like storage networking, power or drive enclosure problems. However, if a distributed array has several hundred drives the chance of this event occurring due to individual drives failure becomes much higher, particularly as it is much more likely with such systems that user will tend to 'batch up' drive replacement procedures and perhaps not act on a single, or perhaps even double, failure using (distributed) spare usage to keep operational costs involved in human maintenance down.

Distributed arrays have an increased need over traditional arrays to tolerate more drive failures prior to requiring user intervention as it will be more 'normal' to run arrays degraded and more normal, with large sets of drives, to observe multiple simultaneous failures

SUMMARY

In an aspect of the invention there is provided a controller for a disk array, the disk array configured for two redundant strips of data in a stride of data strips, the controller comprising: a failed strip identifier for identifying a failed strip in a critical stride strip in disk array when the disk array has two or more failed disks, a critical stride is a stride with two failed strips, a failed strip is a strip in a failed disk, a failed drive is a drive that can no longer be reliably used; a safe strip identifier for identifying a safe strip in a safe stride, a safe stride is a stride with no failed strips, a safe strip is a strip in a safe stride; a disk array writer for writing a recalculated failed strip to the disk array location for the safe strip; and a lending table writer for writing the failed strip location and associated safe strip location to a lending table.

According to another aspect of the invention there is provided a method for a disk array controller, the disk array configured for two redundant strips of data in a stride of data strips, the method comprising: identifying a failed strip in a critical stride in drive array when the drive array has two or more failed drives, a critical stride is a stride with two failed strips, a failed strip is a strip in a failed drive, a failed drive is a drive that can no longer be reliably used; identifying a safe strip in a safe stride, a safe stride is a stride with no failed strips, a safe strip is a strip in a safe stride; writing a recalculated failed strip to a safe strip location; and writing to a lending table for each critical stride, the recalculated failed strip location and associated safe strip location.

According to a further aspect of the invention there is provided a computer program, for a disk array controller, the disk array configured for two redundant strips of data in a stride of data strips, the computer program stored on a computer readable medium and loadable into the internal memory of a digital computer, comprising software code portions, when said program is run on a computer, for performing the following steps: identifying a failed strip in a critical stride in drive array when the drive array has two or more failed drives, a critical stride is a stride with two failed strips, a failed strip is a strip in a failed drive, a failed drive is a drive that can no longer be reliably used; identifying a safe strip in a safe stride, a safe stride is a stride with no failed strips, a safe strip is a strip in a safe stride; writing a recalculated failed strip to a safe strip location; and writing to a lending table for each critical stride, the recalculated failed strip location and associated safe strip location.

According to a further aspect of the invention there is provided a controller for a disk array, the disk array configured for R redundant strips of data in a stride of data strips, the controller comprising: a failed strip identifier for identifying a failed strip in a critical stride strip in disk array when the disk array has R or more failed disks, a critical stride is a stride with R failed strips, a failed strip is a strip in a failed disk, a failed drive is a drive that can no longer be reliably used; a safe strip identifier for identifying a safe strip in a safe stride, a safe stride is a stride with at least R-2 failed strips, a safe strip is a strip in a safe stride; a disk array writer for writing a recalculated failed strip to the disk array location for the safe strip; and a lending table writer for writing the failed strip location and associated safe strip location to a lending table.

According to a further aspect of the invention there is provided a method for a disk array controller, the disk array configured for R redundant strips of data in a stride of data strips, the method comprising: identifying a failed strip in a critical stride in drive array when the drive array has R or more failed drives, a critical stride is a stride with R failed strips, a failed strip is a strip in a failed drive, a failed drive is a drive that can no longer be reliably used; identifying a safe strip in a safe stride, a safe stride is a stride with at least R-2 failed strips (at least two less failed strips than the number of failed strips in a critical stride), a safe strip is a strip in a safe stride; writing a recalculated failed strip to a safe strip location; and writing to a lending table for each critical stride, the recalculated failed strip location and associated safe strip location.

BRIEF DESCRIPTION OF THE DRAWINGS

Preferred embodiments of the present invention will now be described, by way of example only, with reference to the following drawings in which:

FIG. 2B is a component diagram of RAID6 redistribution controller 200 of the preferred embodiment;

FIG. 4A to 4C are example disk arrays of three stages of a RAID6 redistribution of the preferred embodiment;

FIG. 5 are data structures used in the preferred embodiment;

DETAILED DESCRIPTION

Figure 1A:
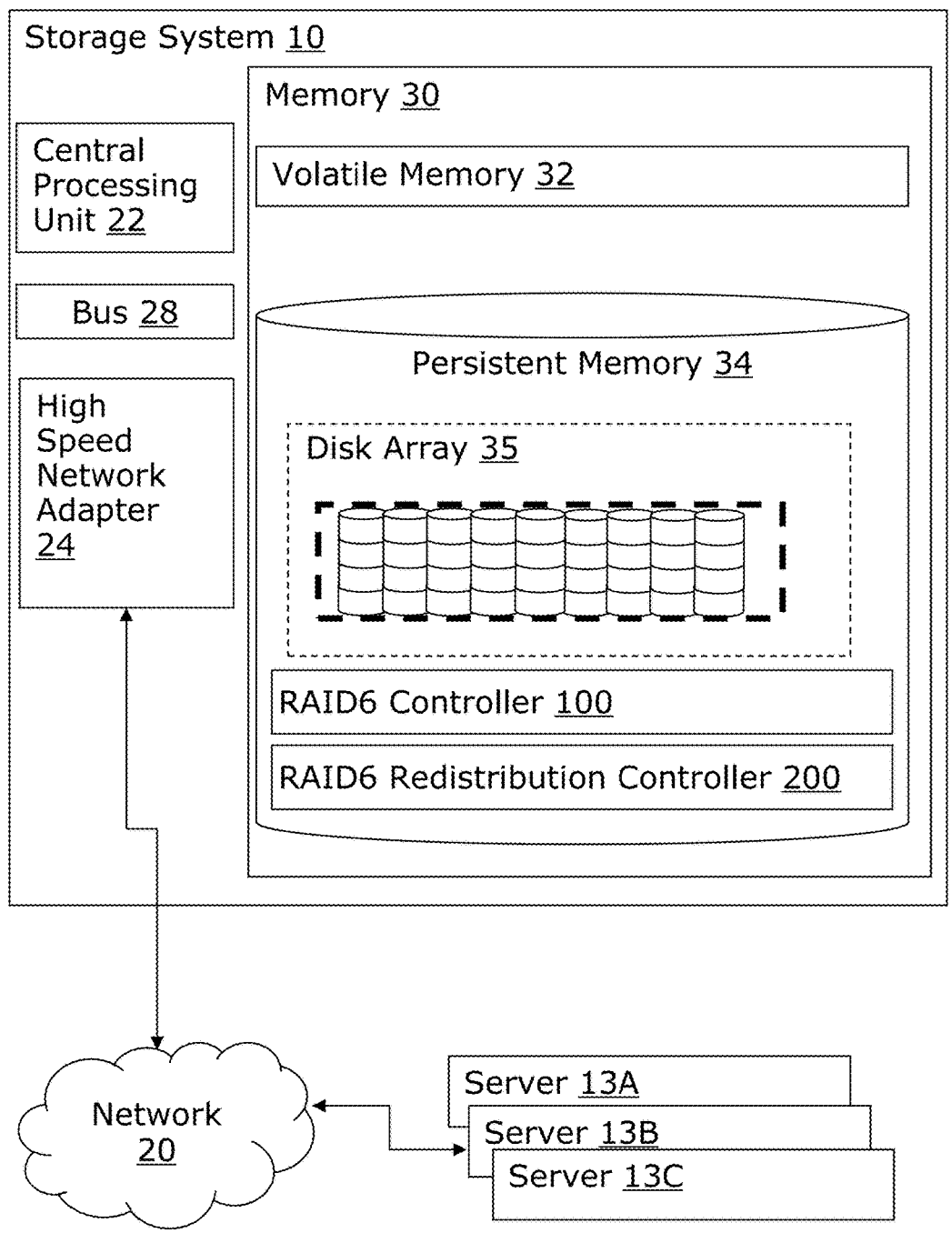
FIG. 1A is a representation of a disk array used in a RAID6 deployment.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1A, the deployment of a preferred embodiment storage system 10 is described. Storage system 10 is operational with numerous other general purpose or special purpose computing system environments or configurations. Examples of well-known computing processing systems, environments, and/or configurations that may be suitable for use with storage system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Storage system 10 may be described in the general context of computer system executable instructions, such as program modules, being executed by a computer processor. Generally, program modules may include: routines; programs; objects; components; logic; and data structures that perform particular tasks or implement particular abstract data types. Storage system 10 may be embodied in distributed cloud computing environments where tasks are performed by remote processing devices that are linked through a communications network. In a distributed cloud computing environment, program modules may be located in both local and remote computer system storage media including memory storage devices.

Storage system 10 is connected to a network 20 and communicates with servers 13A, 13B and 13C. Network 20 can be a local area network (LAN), a wide area network (WAN), or the Internet.

Storage system 10 comprises: central processing unit (CPU) 22; high speed network adapter 24; bus 28 and memory 30.

CPU 22 loads machine instructions from memory 30 and performs machine operations in response to the machine instructions. Such machine operations include: performing an operation on a value in a register (for example arithmetical or logical operations); moving a value from a register to a memory location directly and vice versa; and conditional or non-conditional branching. A typical CPU can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language in terms of machine operations.

High speed network adapter 24 is for enabling communication between the computer server 12 and network devices.

Bus 28 couples the main system components together including memory 30 to CPU 22.

Memory 30 includes computer system readable media in the form of volatile memory 32 and non-volatile or persistent memory 34.

Volatile memory 32 is used for operational memory.

Persistent memory 34 comprises disk array 35 and further system disk memory for storing system modules.

As will be further depicted and described below, memory 30 includes a program product having modules configured to carry out the functions of embodiments of the invention comprising: RAID 6 controller 100 and RAID 6 redistribution engine 200. In the preferred embodiment modules 100 and 200 are loaded from the persistent memory 34, where it is stored, into volatile memory 32 for operation. In another embodiment, read only memory (ROM) stores the modules for enabling the storage system 10 to function as a special purpose computer specific to the modules. Further program modules that support the preferred embodiment but are not shown include firmware, boot strap program, operating system, and support applications. Each of the operating system; support applications; other program modules; and program data; or some combination thereof may include an implementation of a networking environment.

The present embodiment is described in terms of RAID6 but other types of disk arrays data protection are applicable including RAID5 and erasure coding.

Figure 1B:
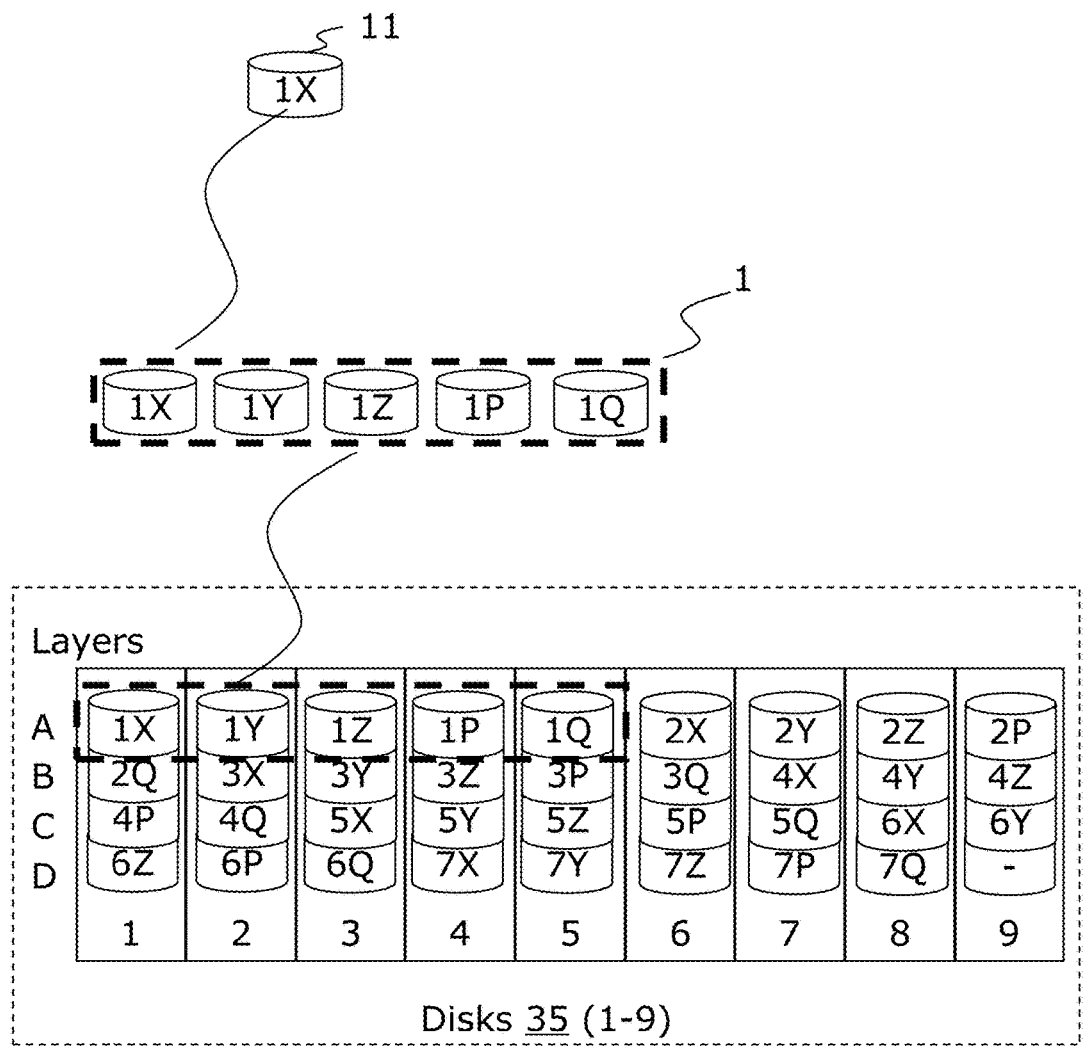
FIG. 1B is a deployment diagram of the preferred embodiment.

Referring to FIG. 1B, a representation of disk array 35 used in a RAID6 deployment comprises 9 disks, each disk having four layers (A, B, C, D), and a layer in a disk being referred to as a strip. Layer is used to represent a logical division of the disks and in reality a disk will have millions of divisions whereby each division on a disk is a strip. A strip (see 1X) is located in a disk array at an array location. For example; strips 1X, 2Z, 3P and 7X are located at array locations 1A, 8A, 5B and 4D respectively. A strip is a segment of data, part of a logical group that forms a sequence called a stride. A stride (see strips 1X, 1Y, 1Z, 1P, 1Q) is a logical group of sequential strips written to or read from disks. In the example, a strip has a strip identifier where the 1st digit is the stride reference and the 2nd digit is the strip reference.

Figure 2A:
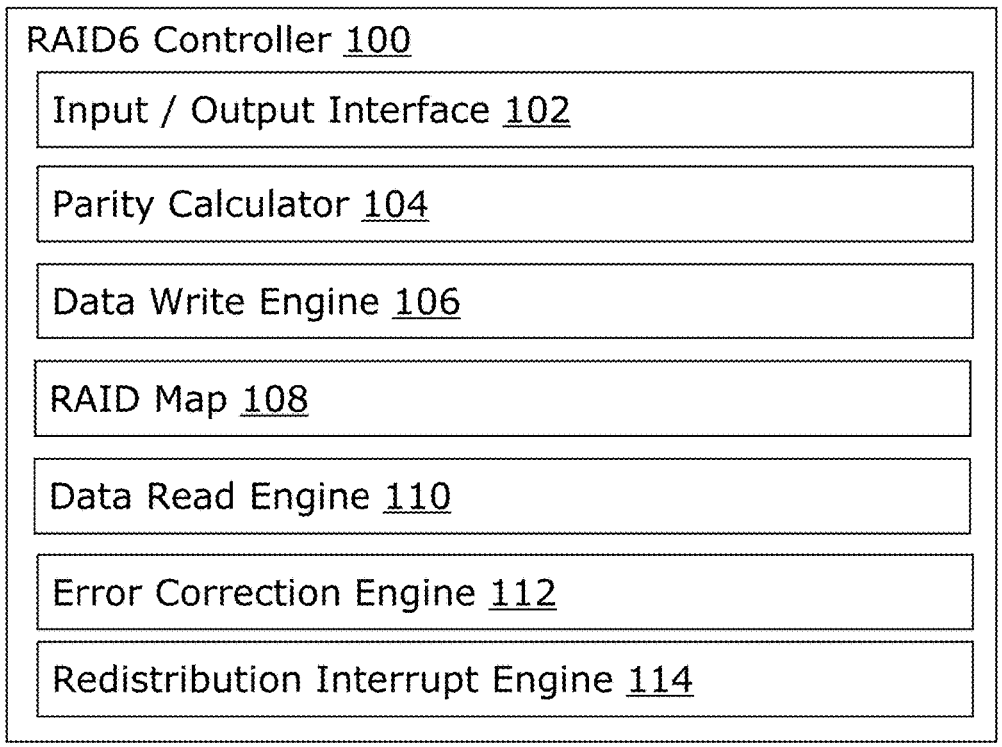
FIG. 2A is a component diagram of RAID6 controller 100 for the preferred embodiment.

Referring to FIG. 2A, RAID6 controller 102 comprises: input/output interface 102; parity calculator 104; data write engine 106; RAID6 map 108; data read engine 110; error correction engine 112; and redistribution interrupt engine 114.

Input/output interface 102 is for controlling all the read requests, write requests and data.

Parity calculator 104 is for calculating parity strips for each stride of data.

Data write 106 is for writing data including parity strips to disk array 35.

RAID6 map is for mapping physical disks to virtual memory locations.

Data read engine 110 is for reading data from the disk array 35.

Error correction engine 112 is for correcting any errors in the disk read using the parity values.

Redistribution interrupt engine 114 is for interrupting each read or write request to invoke RAID redistribution controller 200 for checking for correction in the case of a double disk failure.

Referring to FIG. 2B, RAID6 redistribution controller 200 comprises: redistribution interface 202; failed strip identifier 204; safe strip identifier 206; disk array writer 208; lending table writer 210; lending table 212; redistribution method 300; redistribution read method 340; and redistribution write method 380.

Redistribution interface 202 is for receiving an interrupt for each read or write RAID6 request containing a read or write address range and for forwarding such request to the read or write method as appropriate if the lending table 212 contains critical disk array locations in the read or write address range.

Failed strip identifier 204 is for identifying a failed strip in a critical stride strip in disk array when the disk array has two or more failed disks. A failed stride is a stride with two failed strips, a failed strip is a strip in a failed disk, a failed drive is a drive that can no longer be reliably used.

Safe strip identifier 206 a safe strip identifier for identifying a strip in a stride with no failed strips.

Disk array writer 208 is for writing a recalculated failed strip to the disk array location for the identified strip.

Lending table writer 210 is for writing the recalculated failed strip location and associated identified strip location to a lending table whereby a further disk failure will not break the RAID6 error correction.

Lending table 212 is a table for storing recalculated failed strip locations and associated identified strip locations.

Redistribution method 300 is for managing the RAID6 redistribution controller 200 and is described further below.

Redistribution read method 340 is for managing disk array reads for failed strides and is described further below.

Redistribution write method 380 is for managing disk array writes for failed strides and is described further below.

Figure 3:
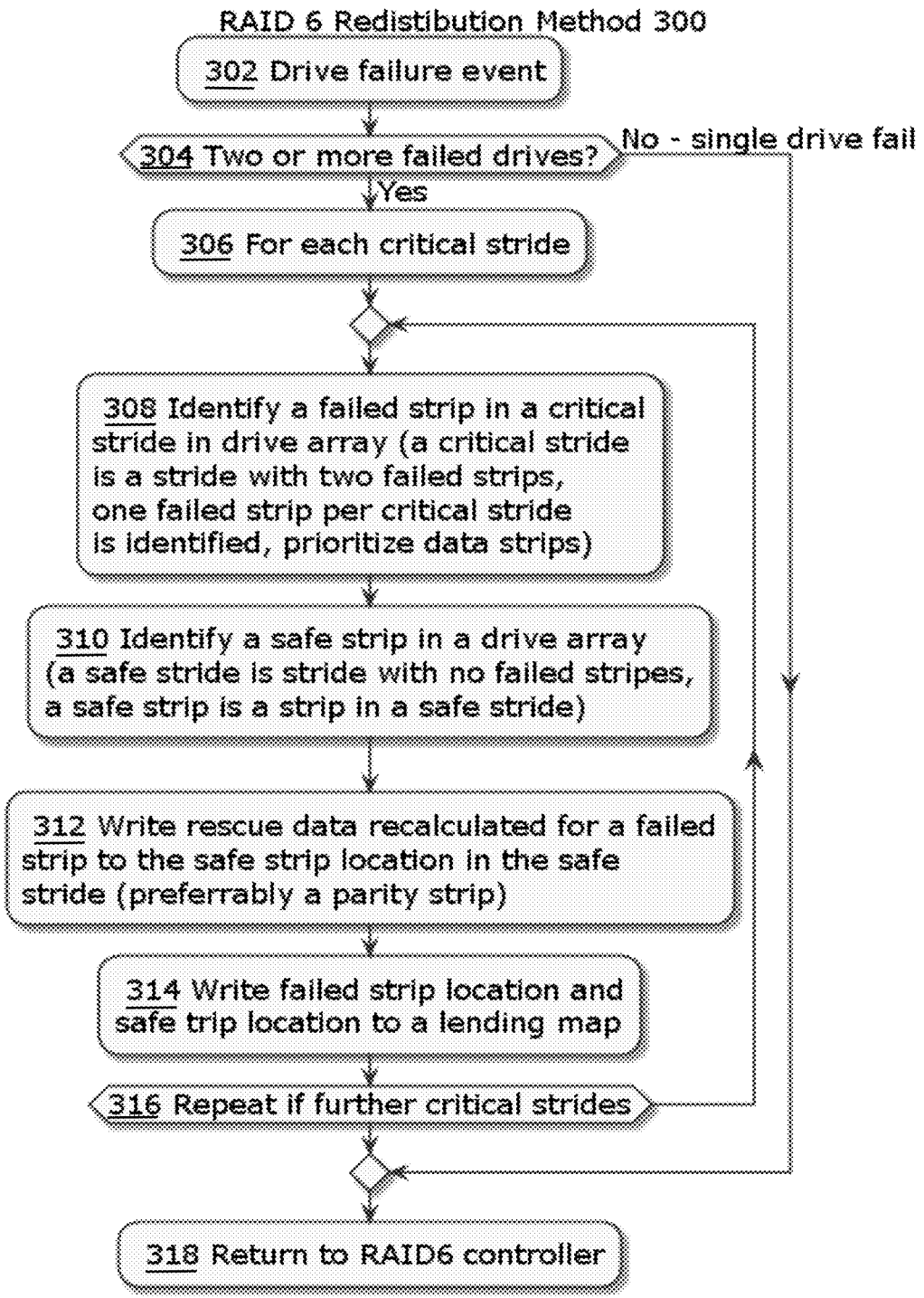
FIG. 3 is a flow diagram of a redistribution method of the preferred embodiment.

Referring to FIG. 3, preferred embodiment method 300 comprises logical process steps 302 to 318. Although there is an order to the preferred embodiment steps as described, the steps may not necessarily need to be in this order unless specified and in other embodiments steps can be in a different order.

Step 302 is the start of redistribution method 300 and is trigger on a drive failure event. In the example of FIG. 4A to 4C, two disks 8 and 9 have failed and the method is initiated by a failure event identifying one or both of these two disks.

Step 304 is for continuing to step 306 if the failure event has resulted in two or more failed disks. Otherwise the method returns via end step 320. Two drives are counted because the preferred embodiment is RAID6 having two parity strips. In the example, two disks have failed so the method proceeds to step 306.

Step 306 is for setting up a repeating loop for each critical stride. In the example, there are three repetitions for critical strides 2, 4 and 6.

Step 308 is for identifying a failed strip in a critical stride in the drive array. A critical stride is a stride with two failed strips. A failed strip is a strip in a failed drive. In the example, strips 2Z, 2P, 4Y, 4Z, 6X and 6Y are failed strips because they are in failed drives. Therefore strides 2, 4 and 6 are critical strides. See critical stride list 500B in FIG. 5. There are two failed strips in a critical stride and if only one is data then this is the strip that is identified.

Step 310 is for identifying a safe strip in a safe stride in the drive array. A safe stride is a stride with all functioning strips (no failed strips). In the example, strides 1, 3, and 5 are safe strides because they have no failed strips. Stride 7 is neither critical nor safe because it has a single failed strip. See safe stride list 500C in FIG. 5. A safe strip in a safe stride can be overwritten with rescue data from a recalculated failed strip the critical strip. Preferably the safe strip is a parity strip so that data will not be to be calculated for the safe stride when the safe stride is read in normal operation. In the example, safe strips in safe strides 1, 3 and 5 are: 1P or 1Q; 3P or 3Q; and 5P or 5Q. In other embodiments, a data strip could be chosen as a rescue strip.

Step 312 is for writing rescue data recalculated for the failed strip to the safe strip location in the safe stride. The rescue data can be a recalculated parity strip if both of the failed strips are parity strips, the rescue data is recalculated from the undamaged data strips. Rescue data is calculated by error correction engine 112 in the RAID6 controller 100 using standard double parity RAID6 error correction for double parity. Preferably the rescue strip is a recalculated data strip if at least one of the damaged strips is a data strip because storing the data strip will eliminate repeating the data calculation when the stride is read. In this case one data recalculation from two data strips and one parity strip is needed when overwriting the safe location. If both of the failed strips are data strips then one data recalculation from one data strip and two parity strips is needed when overwriting the safe location. In another embodiment, the rescue data could be parity data if one of the damaged strips is a data strip but then the data strip would take more time to calculate when reading the stride. See FIG. 4C in which: data strip 2Z is calculated and written to disk location 5A; data strip 4Y is calculated and written to disk location 6B; and data strip 6X is calculated and written to disk location 7C.

Step 314 is for writing the failed strip location and safe strip location in a lending table. See FIG. 5D where rescue data references "2Z", "4Y", "6X" and respective disk locations "5A", "6B" and "7C" are written to the lending table.

Step 316 is for repeating if further critical strides exist otherwise the process continues at 320.

Step 318 is the end of the process and return to the RAID6 controller.

Referring to FIG. 4A, there is shown an example nine disk array with no failed disks. Layers A to D provide 36 strips labeled 1A to 9D.

Referring to FIG. 4B, there is shown an example nine disk array with two failed disks 8 and 9 shown as indicated by the crosses through the disks. Data strips 2Z, 2P, 4Y, 4Z, 6X, 6Y and 7Q are effected.

Referring to FIG. 4C, there is shown an example nine disk array with two failed drives whereby recalculated data (2Z, 4Y, 6X) has been written into safe strips (5A, 6B, 7C).

Referring to FIG. 5 data structures including stride table 500A, critical stride list 500B, safe stride list 500C and lending table 500D are described.

Stride table 500A comprises a stride column for stride number and an array location column for the array location value where the stride starts. In the example strides 1, 2, 3, 4, 5, 6 and 7 are shown with corresponding array locations of: 1A, 6A, 2B, 7B, 3C, 8C and 4D.

Critical stride list 500B comprises a list of critical strides that are located in the method. In the example, critical strides are: 2, 4, and 6. Also stored in the critical stride list with each critical stride are the failed strips references. In the example for: 2Z, 2P, 4Y, 4Z, 6X & 6Y. Only 2P is the failed parity strip. Failed strips shown in bold and underlined are chosen for recalculation.

Safe stride list 500C is a list of safe strides and identified safe strip in the safe stride: stride 1 strip 5A; stride 3 strip 6B; and stride 5 strip 7C.

Lending table 500D is the place for recording that the failed strip that has been recalculated and written to a safe strip location. In the example: critical stride strips 2Z, 4Y and 6X are written to safe strips 5A, 6B and 7C.

Figure 6:
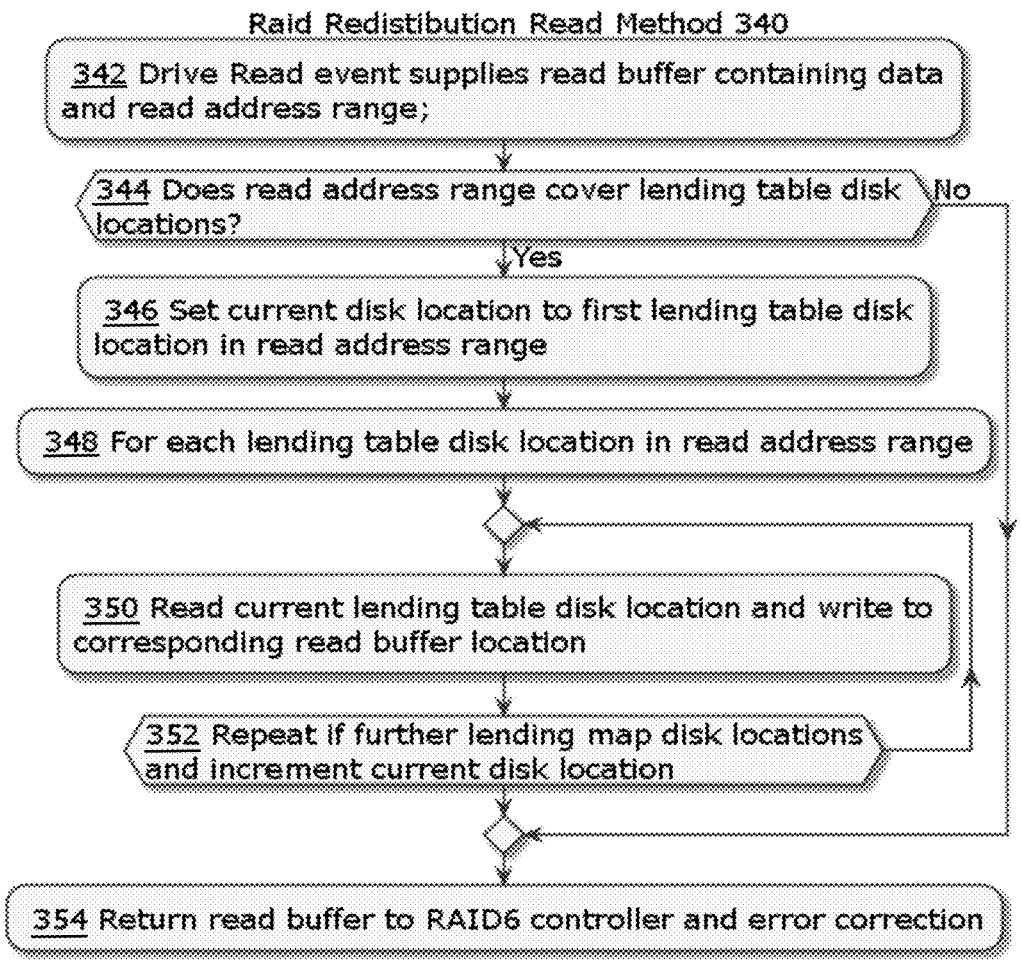
FIG. 6 is a flow diagram of a read method of the preferred embodiment.

Referring to FIG. 6, a flow diagram of a read method is described comprising logical process steps 342 to 354.

Step 342 is for receiving a drive read event that supplies 1) a read buffer containing data and 2) a read address range.

Step 344 is for proceeding to step 346 if the read address range covers lending table disk locations. Else the process ends at step 354.

Step 346 is for setting the current disk location to first lending table disk location in read address range.

Step 348 is repeating in a loop for each lending table disk location in read address range.

Step 350 is for reading the current lending table disk location and writing to corresponding read buffer location.

Step 352 is for incrementing the current disk location and repeating step 350 if there are further lending map disk locations.

Step 354 is for returning control of the read buffer to the RAID 6 controller for error correction.

Figure 7:
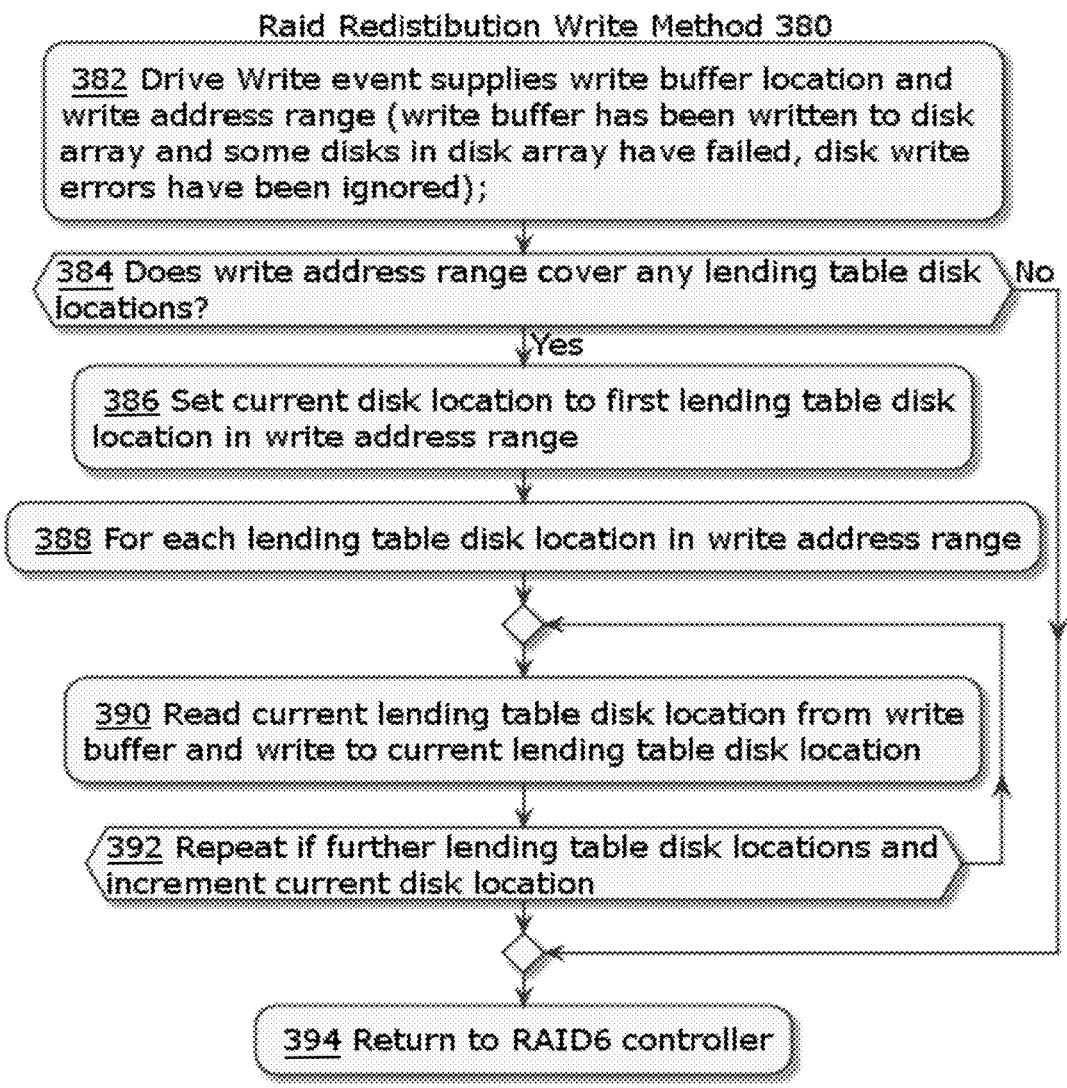
FIG. 7 is a flow diagram of a write method of the preferred embodiment.

Referring to FIG. 7, a flow diagram of a write method is described comprising logical process steps 382 to 394.

Step 382 is for receiving a disk write event that supplies 1) a write buffer contain data written to disk and 2) a write address range. The write buffer has been written to the disk array, some disks in disk array have failed and disk write errors have been ignored.

Step 384 is for continuing to step 386 if the write address range covers any lending table disk locations. Otherwise the process continues at step 396.

Step 386 is for setting a current disk location to the first lending table disk location in write address range.

Step 388 is for defining a loop for each lending table disk location in write address range.

Step 390 is for reading current lending table disk location from write buffer and writing to the current lending table disk location.

Step 392 is for incrementing the current disk location and repeating step 390 if there are further lending table disk locations.

Step 394 is for returning control to RAID6 controller.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A controller for a drive array, the drive array configured for two redundant strips of data in a stride of data strips, the controller comprising:
a failed strip identifier for identifying a failed strip in a critical stride in a drive array when the drive array has two or more failed drives, wherein the critical stride is a stride with two failed strips, the failed strip is a strip in a failed drive, and the failed drive is a drive that can no longer be reliably used;
a safe strip identifier for identifying a safe strip in a safe stride, wherein the safe stride is a stride with no failed strips, and the safe strip is a strip in the safe stride;
a drive array writer for writing a recalculated failed strip to a drive array location of the safe strip; and
a lending table writer for writing a failed strip location and associated safe strip location to a lending table.

2. The controller for a drive array according to claim 1, wherein the failed strip identifier, the safe strip identifier, and the lending table writer operate for each critical stride in a drive array.

3. The controller for a drive array according to claim 1, wherein the recalculated failed strip is calculated when there is a failed data strip and a failed parity strip in an associated critical stride.

4. The controller for a drive array according to claim 1, wherein the lending table is any data structure providing a list of associated recalculated failed strip locations and safe strip locations.

5. The controller for a drive array according to claim 1, wherein the safe strip is a parity strip.

6. A method for a drive array controller, the drive array configured for two redundant strips of data in a stride of data strips, the method comprising:

identifying a failed strip in a critical stride in a drive array when the drive array has two or more failed drives, wherein the critical stride is a stride with two failed strips, the failed strip is a strip in a failed drive, and the failed drive is a drive that can no longer be reliably used;

identifying a safe strip in a safe stride, wherein the safe stride is a stride with no failed strips, and the safe strip is a strip in the safe stride;

writing a recalculated failed strip to a drive array location of the safe strip; and writing, to a lending table, a failed strip location and associated safe strip location.

7. The method according to claim 6, wherein identifying a failed strip, identifying a safe strip, writing a recalculated failed strip, and writing to a lending table are performed for each identified critical stride in a drive array.

8. The method according to claim 6, wherein the recalculated failed strip is calculated when there is a failed data strip and a failed parity strip in an associated critical stride.

9. The method according to claim 6, wherein the lending table is any data structure providing a list of associated recalculated failed strip locations and safe strip locations.

10. The method according to claim 6, wherein the safe strip is a parity strip.

11. A computer program product for a drive array controller, the drive array configured for two redundant strips of data in a stride of data strips, the computer program product comprising a computer-readable storage medium having computer-usable program code embodied therein, the computer-usable program code configured to perform the following when executed by at least one processor:

identify a failed strip in a critical stride in a drive array when the drive array has two or more failed drives, wherein the critical stride is a stride with two failed strips, the failed strip is a strip in a failed drive, and the failed drive is a drive that can no longer be reliably used;

identify a safe strip in a safe stride, wherein the safe stride is a stride with no failed strips, and the safe strip is a strip in the safe stride;

write a recalculated failed strip to a drive array location of the safe strip; and write, to a lending table, a failed strip location and associated safe strip location.

* * * * *